US010295007B2

(12) United States Patent
McIntosh

(10) Patent No.: US 10,295,007 B2
(45) Date of Patent: May 21, 2019

(54) SUBSEA DYNAMIC LOAD ABSORBER

(71) Applicant: Subsea 7 Limited, Sutton (GB)

(72) Inventor: Murray Jamieson McIntosh, Inverurie (GB)

(73) Assignee: Subsea 7 Limited, Sutton (GB)

(*) Notice: Subject to any disclaimer, the term of this patent is extended or adjusted under 35 U.S.C. 154(b) by 128 days.

(21) Appl. No.: 15/505,066

(22) PCT Filed: Aug. 21, 2015

(86) PCT No.: PCT/GB2015/052438
§ 371 (c)(1),
(2) Date: Feb. 17, 2017

(87) PCT Pub. No.: WO2016/027103
PCT Pub. Date: Feb. 25, 2016

(65) Prior Publication Data
US 2017/0241501 A1    Aug. 24, 2017

(30) Foreign Application Priority Data

Aug. 22, 2015   (GB) .................................. 1414983.5

(51) Int. Cl.
*F16F 9/10*   (2006.01)
*F16F 9/36*   (2006.01)
(Continued)

(52) U.S. Cl.
CPC .............. *F16F 9/10* (2013.01); *B63B 21/502* (2013.01); *B63B 35/40* (2013.01); *B63C 11/44* (2013.01);
(Continued)

(58) Field of Classification Search
CPC ......... B63B 21/502; B63B 3/40; B63B 35/40; B63B 2003/147; B63B 2021/005;
(Continued)

(56) References Cited

U.S. PATENT DOCUMENTS 3,158,208 A   11/1964   Kammerer
3,551,005 A   12/1970   Brun
(Continued)

FOREIGN PATENT DOCUMENTS

GB   2 178 132   2/1987
GB   2495840     4/2013
WO   WO 2014/035254   3/2014

*Primary Examiner* — Robert A. Siconolfi
*Assistant Examiner* — San M Aung
(74) *Attorney, Agent, or Firm* — Levy & Grandinetti

(57) ABSTRACT

A load absorber dampens relative movement between subsea bodies. The load absorber is cooperable with an actuating member such as a male piston element or a female cup on an opposed subsea body. The load absorber comprises a hollow structure defining an internal flow path for water. A flow restrictor acting on the flow path restricts a distal flow of water along the flow path from a proximal opening, caused by convergence between the actuating member and the load absorber. The flow restrictor comprises a shuttle element to restrict the flow path that is mounted to the structure for automatic movement from a first state to a second state in response to an increase in water pressure at the proximal opening. In the first state, the shuttle element effects greater restriction of the flow path than in the second state.

47 Claims, 10 Drawing Sheets

(51) Int. Cl.
  *B63B 21/00* (2006.01)
  *B63B 21/50* (2006.01)
  *B63B 35/40* (2006.01)
  *B63C 11/44* (2006.01)
  *E21B 19/00* (2006.01)
(52) U.S. Cl.
  CPC ............ *E21B 19/002* (2013.01); *F16F 9/369* (2013.01); *B63B 2021/005* (2013.01)
(58) Field of Classification Search
  CPC . B63B 2021/501; B63B 21/50; B63B 22/021; B63C 11/44; B63C 11/52; B63G 8/001; E21B 19/006; E21B 19/002; F16F 15/06; F16F 7/10; F16F 9/10; F16F 9/369
  USPC ....... 188/275, 286; 405/224; 267/34; 175/27
  See application file for complete search history.

(56) References Cited

U.S. PATENT DOCUMENTS

| | | | | |
|---|---|---|---|---|
| 3,919,957 | A * | 11/1975 | Ray | B63B 21/502 |
| | | | | 114/265 |
| 4,039,176 | A | 8/1977 | Jansen, Jr. | |
| 4,257,721 | A * | 3/1981 | Haynes | E02D 7/00 |
| | | | | 114/295 |
| 4,576,520 | A | 3/1986 | Suh et al. | |
| 4,701,076 | A * | 10/1987 | Chiu | B63B 21/502 |
| | | | | 405/195.1 |
| 4,721,053 | A * | 1/1988 | Brewerton | B63B 21/50 |
| | | | | 114/230.13 |
| 4,721,417 | A * | 1/1988 | Piazza | E02B 17/027 |
| | | | | 405/195.1 |
| 2009/0290939 | A1 * | 11/2009 | Large | B63B 21/502 |
| | | | | 405/224 |

* cited by examiner

SUBSEA DYNAMIC LOAD ABSORBER

This invention relates to the absorption and dissipation of dynamic loads arising between relatively-movable bodies that are in contact underwater.

One application of the invention is to absorb shock loads experienced in a launch and recovery system (LARS) for a wireline-deployed subsea payload. Examples of such payloads are a diving bell or an ROV system. An ROV system typically includes a tether management system that has to be launched and recovered with the ROV.

A LARS may be located in a moonpool of a vessel, being a well extending vertically through the hull of the vessel from above the water surface to below the water surface. Alternatively, a LARS may be located on a side of the vessel.

To constrain horizontal movement of the payload during launch and recovery, a typical LARS comprises a mobile cursor to which the payload is coupled temporarily for transit through the air-water interface or 'splash zone'. This reduces the risk of damage to equipment and enlarges the weather window in which subsea payloads may be deployed safely.

The cursor runs on an upright guide structure comprising one or more rails or wires extending from above the surface into the water. The cursor is raised and lowered along the guide structure by a winch. At the bottom of its range of travel on the guide structure, the cursor submerges and then is stopped by an underwater landing base that is fixed in relation to the hull of the vessel. There, the payload is uncoupled from the cursor to be lowered to the desired depth upon launch or is coupled to the cursor for recovery to the vessel.

There is a need to absorb and remove kinetic energy when the cursor lands on the landing base, particularly with the aim of reducing shock loads caused by sudden deceleration. This ensures a soft landing that avoids damage to the cursor, the landing base or the fragile payload. There is also a need to resist or to damp movement of the cursor relative to the landing base after landing, including upward lifting movement of the cursor relative to the landing base as may be caused by wave action or vessel heave.

More generally, there is a need remotely to absorb and dissipate kinetic energy arising from movement, vibration or oscillation of a mass in an underwater environment. One example is to absorb shock loads when landing wireline-deployed equipment at a seabed location, such as a running tool insert for a subsea choke. Another example is to damp vibration or oscillation of pipes or other subsea structures to reduce fatigue and to combat mechanical resonance.

Prior art solutions to absorb shock loads underwater mirror those used above the surface in air. In essence, they involve springs or shock absorbers, the latter comprising closed cylinders or closed hydraulic circuits.

To illustrate spring-based solutions known in the prior art, FIG. 1 of the drawings shows two such solutions in one schematic drawing. A first, simple solution is shown on the left in FIG. 1 and a second, more complex solution is shown on the right. In both solutions, a vessel 10 comprises a moonpool 12 extending vertically through the hull 14 of the vessel 10 from above the water surface 16 to below the water surface 16. At the bottom of the moonpool 12, an underwater landing base 18 is cantilevered inwardly from a wall of the hull 14 surrounding the moonpool 12.

A LARS fitted to the vessel 10 comprises a cursor 20 suspended by a winch wire 22 that is movable up and down within the moonpool 12 to positions above and below the water surface 16. The cursor 20 is shown in FIG. 1 in two underwater positions, one on the left approaching contact with the landing base 18 and the other on the right resting upon the landing base 18. For clarity, guide structures such as rails for the cursor 20 and a winch acting on the winch wire 22 have been omitted from FIG. 1.

In both of the solutions shown in FIG. 1, compression springs 24 act between the cursor 20 and the landing base 18. In this example, the springs 24 hang down from the cursor 20. This makes the springs 24 accessible for maintenance and replacement when the cursor 20 is lifted out of the water into a raised position. However, mounting the springs 24 on the cursor 20 increases the risk of clashing as the cursor 20 moves in the moonpool 12. Whilst that risk may be addressed by instead mounting springs on the landing base 18 facing upwardly, such an arrangement makes maintenance and replacement of the springs more difficult as they are then constantly underwater.

Springs corrode quickly, especially if constantly immersed in sea water, and so have to be replaced often. The LARS suffers downtime as a result. Also, springs store energy while supporting the mass of the cursor, which energy adds to the upthrust of wave motion to drive upward acceleration of the cursor. Thus, another drawback of springs as shock absorbers is their tendency to cause a mobile body such as a cursor to bounce, which tendency is amplified underwater by hydrodynamics phenomena adding apparent mass and drag to the mobile body. This is a particular drawback of the unrestrained spring solution shown on the left in FIG. 1.

Bounce may be limited, but not prevented, by adding counteracting springs 26 shown in the prior art solution on the right in FIG. 1. In this example, the counteracting springs 26 extend upwardly from mountings on top of the cursor 20. When the cursor 20 moves upwardly to a sufficient extent, the counteracting springs 26 act in compression against a latch member 28 overhanging the cursor 20. This reduces the operating travel of the cursor 20.

The latch member 28 deploys from a wall of the hull 14 surrounding the moonpool 12 when the cursor 20 is lowered sufficiently beneath the latch member 28. The latch member 28 retracts back against the wall of the hull 14 when the cursor 20 is to be lifted back out of the water toward the top of the moonpool 12.

Many examples of closed cylinders, hydraulic dampers or hydraulic shock absorbers are known but their use underwater presents various challenges. For example, a cylinder or hydraulic circuit has to be leak-tight to avoid water ingress and corrosion. Also, a hydraulic circuit has to be pressure-compensated if it is to be used in deep water.

U.S. Pat. No. 4,039,176 describes a hydraulic damper for a shock absorber apparatus used in a marine riser. That solution is not satisfactory because of the hydraulic system and the risk of oil leakage.

A motion damping apparatus to suppress motion of an offshore structure is described in U.S. Pat. No. 4,576,520. That apparatus employs springs and/or dampers such as slowly-actuating hydraulic pistons, and is unduly complex.

Other types of dampers, shock absorbers and compensators such as heave compensators are known for use underwater, for example for use with cranes. Again, such solutions are not satisfactory as they are based on closed cylinders or closed hydraulic circuits.

It has been proposed to use sea water as a shock-absorbing medium in an effort to avoid the abovementioned problems. For example, WO 2014/035254 describes a shock-absorbing device for use when landing a moving structure onto a fixed structure at a location deep underwater. The device comprises a damper housing on one of the structures. Water is forced through an orifice when a projecting tip of the damper housing contacts the other structure and retracts. This restricted flow of displaced water absorbs impact energy upon landing.

The shock-absorbing device described in WO 2014/035254 is complex, requiring positioning and assembly of numerous moving parts and springs. Also, it is concerned solely with landing a mobile body upon a fixed body at a subsea location. So, the system of WO 2014/035254 is unidirectional in its effect, only cushioning downward motion of the mobile body relative to the fixed body. There is no possibility of the shock-absorbing device resisting or damping subsequent upward motion of the mobile body relative to the fixed body. Indeed, there is no possibility of upward motion in WO 2014/035254 because a mechanical locking mechanism locks the moving structure to the fixed structure immediately upon landing.

GB 2495840 proposes a soft-landing system for managing landing of subsea equipment at a seabed location. Again, sea water is used as a shock-absorbing medium. The system comprises one or more fixed male posts upstanding from a landing base. Each post corresponds with, and is a close sliding fit within, a respective downwardly-opening female funnel receptacle containing a cavity of uniform internal cross-section along its length. The receptacles are mounted on an equipment package that is designed to be installed by wireline on the landing base.

Water trapped in the cavities by entry of the posts into the receptacles provides cushioning resistance as the equipment package settles into full engagement with the landing base. The trapped water is released from the cavity via a narrow orifice in the otherwise closed top of each receptacle to bleed the trapped water slowly into the surrounding sea. Optionally, an ROV-operable valve communicating with the orifice controls bleeding of the trapped water to control the soft landing operation.

Again, the soft-landing system described in GB 2495840 is concerned entirely with landing a mobile body upon a fixed body at a location deep underwater. So, again, the system of GB 2495840 is unidirectional in its effect, only controlling downward motion of the mobile body relative to the fixed body: it does not effectively resist or damp upward motion of the mobile body relative to the fixed body. In this respect, it is noted that a LARS carrying an ROV is more fragile and more impact-sensitive than the type of equipment package disclosed in GB 2495840, yet is more susceptible to shock loadings in view of its location of use around the splash zone.

As the size of the orifice atop each receptacle of GB 2495840 is constant, the cushioning resistance cannot be finely controlled other than by adjusting the ROV-operable valve, where fitted. However, it is not possible to adjust a valve using an ROV in a highly-dynamic environment, and certainly not in the turbulent splash zone location in which a LARS is used.

Unless an impractical ROV-operable valve is used, the orifice of each receptacle in GB 2495840 must remain open during downward movement while the equipment package is being lowered before landing. This generates extra drag and turbulence that could cause detrimental oscillation of the equipment package as its transits through the water column.

GB2178132 also describes a shock absorber that also utilizes seawater for damping effect using a similar post-and-cylinder mechanism to GB 2495840. In this case, a progressively increasing or decreasing dampening effect is achieved by providing an aperture in the side wall of the cylinder and shaping the aperture such that its width is of varying magnitude moving from a proximal end of the cylinder towards a distal end. The deceleration provided by the post-and-cylinder arrangement is controlled by the flow of water out of the cylinder through the aperture, and hence is controlled by aperture size. Because of the varying width of the aperture, the aperture size varies in a non-linear fashion as the piston is depressed. This can be used to provide a non-linear deceleration; for example it can be used to keep the deceleration constant, or it can be used to vary the deceleration if required. However, because the size of the aperture is fixed, the variation in the deceleration is also fixed, and cannot be altered after manufacture of the cylinder. The variation in deceleration is also tied only to the position of the post relative to the cylinder, and cannot be otherwise controlled.

For all of these reasons, the soft-landing system described in GB 2495840 does not solve the problems addressed by the invention.

It is against this background that the present invention has been devised.

In one sense, the invention resides in a subsea load absorber for damping relative movement between subsea bodies. The load absorber is cooperable in use when on one of the subsea bodies with an actuating member on another of the subsea bodies. The load absorber comprises: a hollow structure that defines an internal flow path for water, communicating with a proximal opening; and a flow restrictor acting on the flow path that is positioned to restrict a distal flow of water along the flow path from the proximal opening in use, which distal flow is caused by relative convergent movement between the actuating member and the load absorber. The flow restrictor comprises a shuttle element that is arranged to restrict the flow path and is movably mounted to the structure for automatic movement relative to the structure from a first state to a second state in response to an increase in water pressure at the proximal opening, the shuttle element in the first state effecting greater restriction of the flow path and in the second state effecting lesser restriction of the flow path.

A seal is preferably positioned to act between the load absorber and the actuating member.

In some embodiments, the proximal opening communicates with a socket cavity having an open end adapted to receive a male piston element that serves as the actuating member.

The load absorber may further comprise a distal opening in fluid communication with the proximal opening to exhaust the distal flow of water. In that case, the flow restrictor is disposed between the proximal opening and the distal opening to restrict the distal flow of water along the flow path in use.

The shuttle element is preferably biased to remain in the first state while increasing water pressure at the proximal opening remains below a threshold value and to move into the second state when water pressure at the proximal opening increases to greater than the threshold value.

In the first state, the shuttle element is suitably aligned with a narrowed throat formation of the flow restrictor with respect to a flow direction along the flow path. In the second state, a proximal edge of the shuttle element may align with or lie distally relative to a distal edge of the throat formation. In the second state, the shuttle element may align with a distal cavity of the flow restrictor that provides greater clearance around the shuttle element than when the shuttle element is in the first state.

Relative divergent movement between the actuating member and the load absorber, in use, preferably draws a proximal flow of water through the flow restrictor toward the proximal opening, in which case the shuttle element of the flow restrictor is movable automatically relative to the structure from the first state into a third state in response to a reduction in water pressure at the proximal opening during that relative divergent movement. In the third state, the shuttle element effects less restriction of the flow path than in the first state. Preferably, when in the third state, the shuttle element effects less restriction of the flow path than when in the second state.

Again, the shuttle element is preferably biased to remain in the first state while decreasing water pressure at the proximal opening remains above a threshold value and to move into the third state when water pressure at the proximal opening decreases to less than the threshold value.

In the third state, a distal edge of the shuttle element suitably aligns with or lies proximally relative to a proximal edge of a narrowed throat formation of the flow restrictor. That proximal edge of the throat formation may have a different profile to a distal edge of the throat formation.

In the third state, the shuttle element may be aligned with a proximal cavity of the flow restrictor that provides greater clearance around the shuttle element than when the shuttle element is in the first state. In that case, the proximal cavity suitably provides greater clearance around the shuttle element than when the shuttle element is in the second state.

At least one bias member may act between the structure and the shuttle element to bias the shuttle element into the first state and to permit movement of the shuttle element out of the first state against that bias. The shuttle element may be supported by the or each bias member for movement relative to the structure. For example, the or each bias member may be a spring acting in compression or tension between the shuttle element and the structure.

First and second bias members may act on the shuttle element in mutual opposition, in which case those bias members may apply different levels of restoring force to the shuttle element.

Preferably, the shuttle element substantially occludes the flow path when in the first state. However, an airflow clearance preferably remains around the shuttle element when in the first state.

For compactness, the proximal opening and the flow restrictor are preferably substantially aligned in longitudinal succession. Thus, the proximal opening and the flow restrictor may be substantially aligned with a direction of relative convergent movement between the actuating member and the load absorber;

The invention may also be expressed as a method of damping relative movement between subsea bodies. The method of the invention comprises: effecting relative convergent movement between an actuating member on one of the subsea bodies and a load absorber on another of the subsea bodies to expel water distally along a flow path from a proximal opening through a flow restrictor, and automatically moving a shuttle element of the flow restrictor from a first state to a second state in response to an increase in water pressure at the proximal opening, the shuttle element in the first state effecting greater restriction of the flow path and in the second state effecting lesser restriction of the flow path.

The actuating member may be inserted into the load absorber during the relative convergent movement; alternatively, the load absorber may be inserted into the actuating member during the relative convergent movement. In either case, it is preferred that sealing is effected between the actuating member and the load absorber. The shuttle element may be biased into the first state against increasing water pressure at the proximal opening, and may be held in the first state until water pressure at the proximal opening exceeds a threshold value before allowing the shuttle element to move into the second state. The shuttle element conveniently moves away from the proximal opening when transitioning between the first state and the second state, and suitably returns to the first state when relative convergent movement between the actuating member and the load absorber ceases.

Subsequently, relative divergent movement between the actuating member and the load absorber may draw a proximal flow of water through the flow restrictor toward the proximal opening. In that case, the shuttle element of the flow restrictor is moved automatically from the first state into a third state in response to a reduction in water pressure at the proximal opening, the shuttle element in the third state effecting less restriction of the flow path than in the first state.

The shuttle element conveniently moves toward the proximal opening when transitioning between the first state and the third state, and is suitably held in the first state until water pressure at the proximal opening decreases below a threshold value before being allowed to move into the third state. In any event, the shuttle element preferably returns to the first state when relative divergent movement between the actuating member and the load absorber ceases.

The method of the invention may include the preliminary step of submerging the load absorber to cause water to flood the flow path. In that case, air may be allowed to exhaust from the flooding flow path through the flow restrictor. Indeed, air preferably passes through the flow restrictor when the shuttle element is in the first state.

The inventive concept extends to a subsea load absorber system arranged to act between relatively-movable subsea bodies. The system comprises a load absorber on one of the subsea bodies and an actuating member on another of the subsea bodies. The actuating member is cooperable with the load absorber to define an actuating chamber of variable volume that is flooded with water when the system is submerged in use. The load absorber comprises a hollow structure that defines an internal flow path for water, communicating with the actuating chamber. A flow restrictor acting on the flow path is positioned to restrict an outward flow of water along the flow path from the actuating chamber in use, which outward flow is caused by relative convergent movement between the actuating member and the load absorber that reduces the volume of the actuating chamber. The flow restrictor comprises a shuttle element that is arranged to restrict the flow path and is movably mounted to the structure for automatic movement relative to the structure from a first state to a second state in response to an increase in water pressure in the actuating chamber, the shuttle element in the first state effecting greater restriction of the flow path and in the second state effecting lesser restriction of the flow path.

In the system of the invention, the actuating member is advantageously separate from the load absorber. For example, the actuating member may be a male piston element and the actuating chamber may comprise a socket cavity having an open end positioned to receive the male piston element. Alternatively, the actuating member may be a female cup element that is arranged to receive a protruding part of the load absorber. In either case, a seal is suitably positioned to act between the load absorber and the actuating member to resist egress of water from the actuating chamber between the load absorber and the actuating member.

The inventive concept embraces a submersible or subsea body fitted with at least one load absorber or system of the invention. In embodiments to be described, that body is a cursor or a landing platform of a launch and recovery system. The inventive concept also embraces a vessel comprising a launch and recovery system having a cursor or a landing platform fitted with at least one load absorber or system of the invention.

In summary, preferred embodiments of the invention provide a subsea bidirectional reverse-acting shock-load absorber that operates by using sea water as a damping medium. The load absorber reacts automatically to an unbalanced impact load in either direction along its longitudinal axis. The reaction force is damped by a self-variable orifice of the load absorber that automatically controls the through-flow of water depending on initial impact forces as it decelerates a subsea mass to a standstill. When the subsea mass is stationary, the load absorber automatically resets itself to be ready for the next impact.

Thus, the load absorber of the invention works when submerged in a liquid medium that serves also as a hydraulic fluid. No additional gas-charge or hydraulic systems are required.

When the invention is applied to a LARS comprising a mobile cursor carrying a separable load such as an ROV, a vertical guide means and a landing base, the cursor comprises at least one interface device to damp impact of the cursor on the landing base upon lowering the cursor into water.

In preferred embodiments exemplified in the following description, the interface device comprises a frame or body and at least one internal and substantially vertical elongated channel for water to flow through the frame. The channel has open ends. At least the lower end of the channel is able to engage a stopper plug or post that is fixedly located on the landing base and is dimensioned substantially to restrict the diameter of the channel.

At least one shuttle plug inside the internal channel of the frame defines upper and lower chambers of the channel. At least one spring suitably connects the shuttle plug to the frame. The shuttle plug is able to move axially and automatically inside the channel under the combined action of water flow, frame deceleration and spring return force. The shuttle plug is movable between at least two positions, namely an open position that allows restricted water flow between lower and upper chambers of the channel and a closed position.

The, or each, spring holds the shuttle plug in the closed position against the drag force of water in the channel when the interface device is moving at nearly uniform velocity. However, the spring allows at least partial opening of the shuttle plug when pressure increases inside the lower chamber when the lower chamber engages the fixed stopper plug or post of the landing base, which automatically generates progressive outflow of water between the lower chamber and the upper chamber.

In exemplary embodiments, the shuttle plug may be equipped with first and second reversed spring systems to deal with two opposite directions of motion of the interface device, such as downwards and upwards. Also, the cross-section of the shuttle plug may vary to allow different flow rates during deceleration of a subsea mass.

The invention may also be expressed as a method for absorbing the energy of a carriage impacting on a landing base located under water. The method comprises: moving the carriage into or through water, for example lowering the carriage along a vertical guide structure; engaging a channel of at least one damping interface device on the carriage with at least one stopper plug or post that substantially blocks the channel when at least partially inserted into the channel; biasing a shuttle plug in the channel to close the channel, thus forming a lower or proximal chamber of the channel; and progressively evacuating pressure build-up in the lower or proximal chamber caused by insertion of the stopper plug by automatically opening the shuttle plug. Advantageously, the bias on the shuttle plug is sufficient to keep the channel closed when pressure inside the lower chamber does not exceed a drag force experienced by the damping interface device during lowering of the carriage.

In some embodiments, the subsea load absorber comprises a hollow structure that defines an internal flow path for water, wherein the flow path comprises: a socket cavity having an open end positioned to receive a male piston element protruding from an opposed subsea body, the socket cavity being floodable with water when the load absorber is submerged in use; an opening in fluid communication with the socket cavity to exhaust an outward flow of water expelled along the flow path, in use, from the socket cavity by insertion of the piston element into the socket cavity through the open end; and a flow restrictor between the socket cavity and the opening to restrict the outward flow of water along the flow path from the socket cavity to the opening in use. The flow restrictor comprises a shuttle element that is arranged to restrict the flow path and is movably mounted to the structure for automatic movement relative to the structure from a first state to a second state in response to an increase in water pressure in the socket cavity, the shuttle element in the first state effecting greater restriction of the flow path and in the second state effecting lesser restriction of the flow path.

Reference has already been made to FIG. 1 of the accompanying drawings, which is a schematic side view of two sprung load-absorber solutions of the prior art. In order that the invention may be more readily understood, reference will now be made, by way of example, to the remaining drawings in which.

Figure 4:
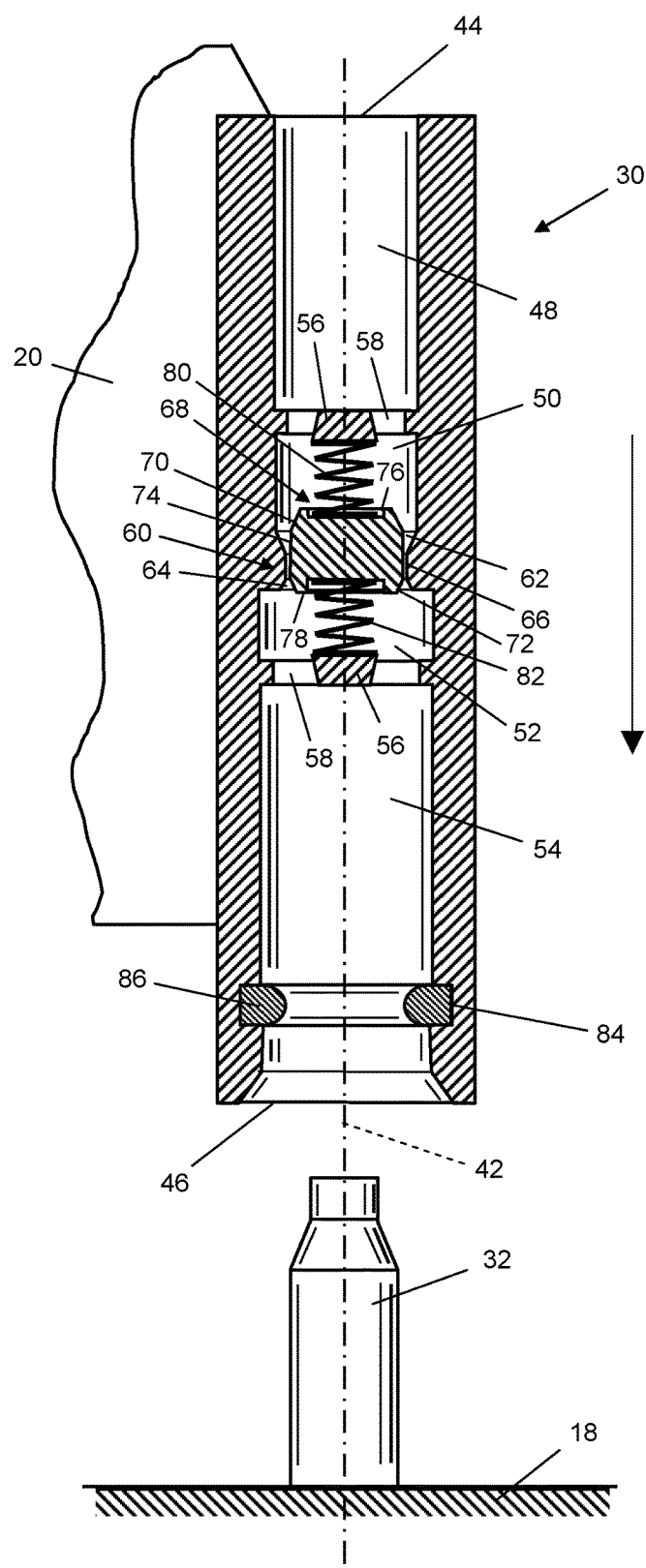
FIG. 4 is an enlarged sectional side view of one of the load absorbers shown schematically in FIGS. 2 and 3, approaching engagement with a post.
Figure 5:
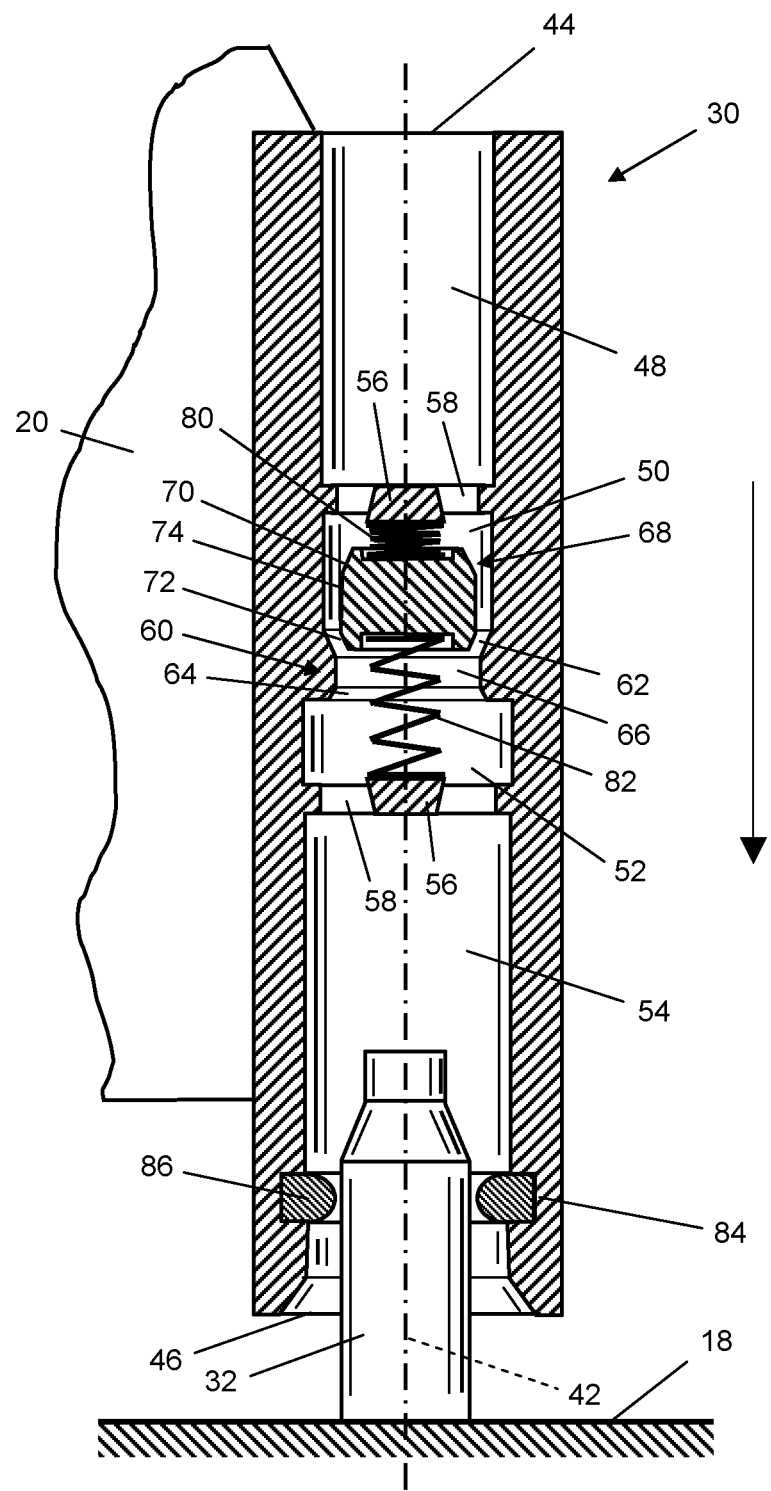
Figure 6:
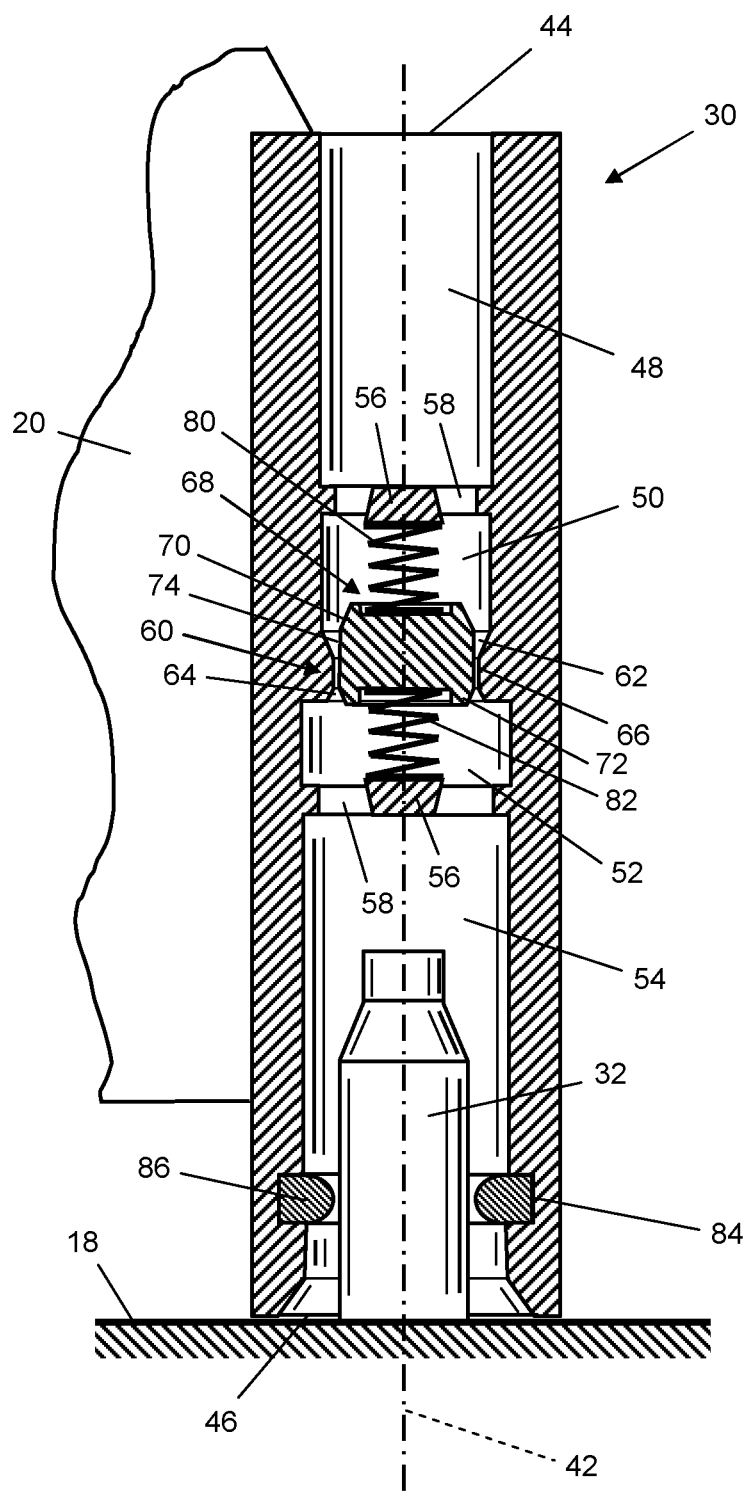
Figure 7:
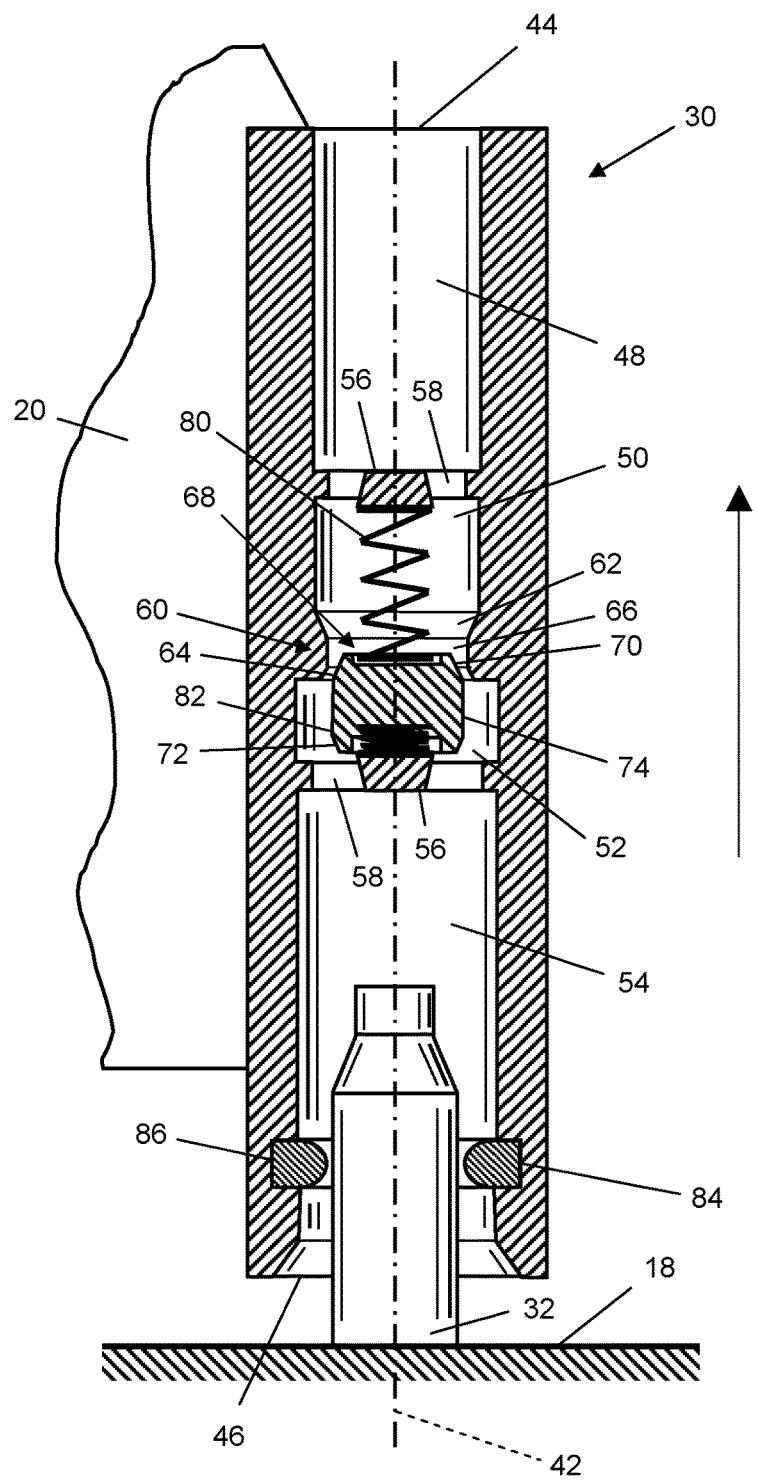
Figure 8:
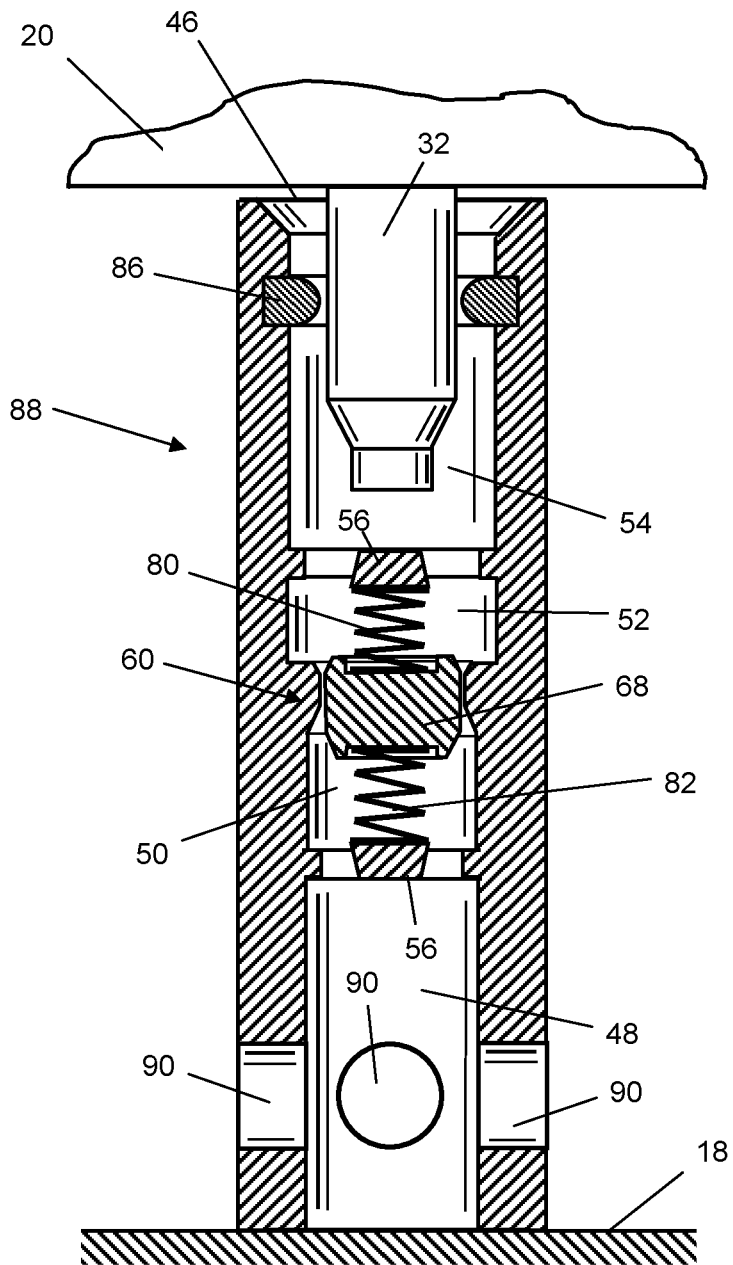
Figure 9:
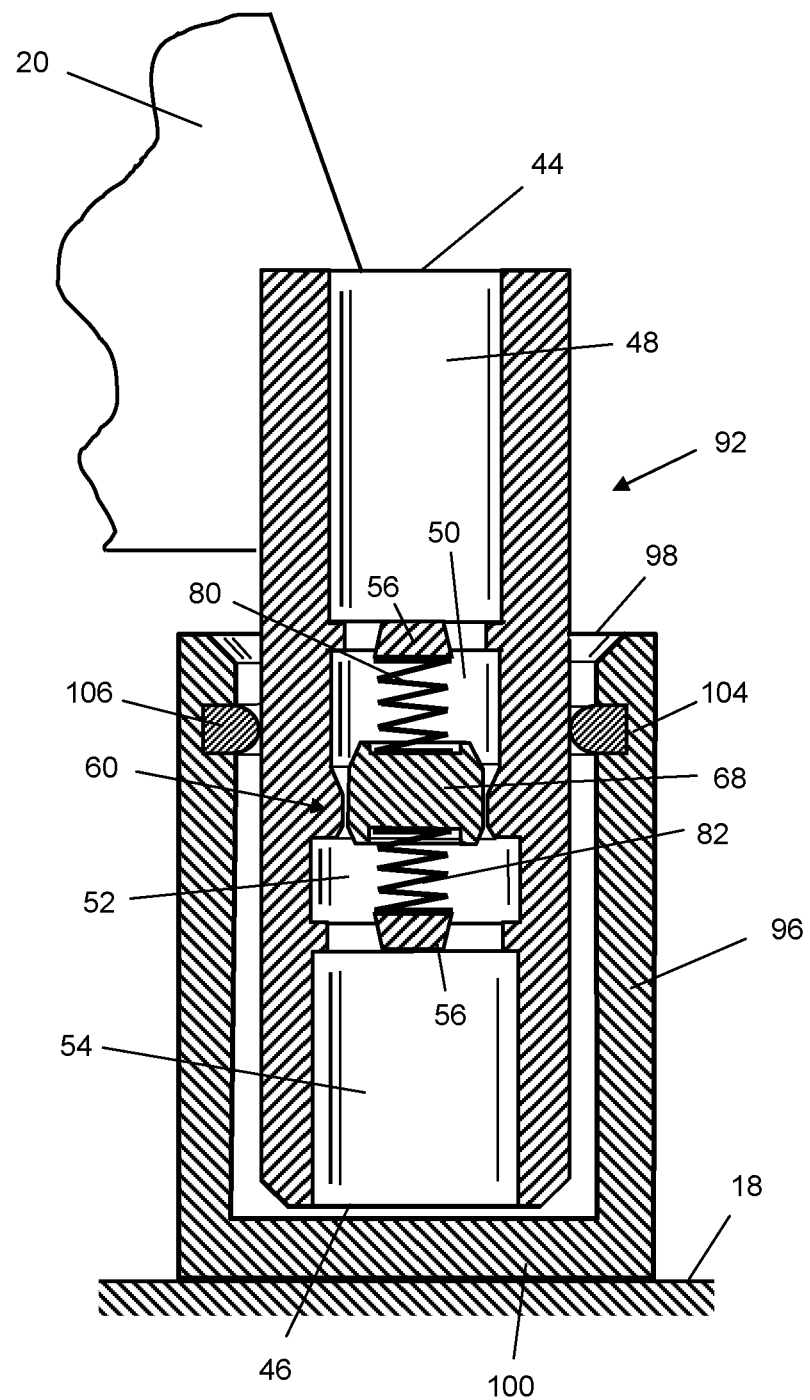
Figure 10:
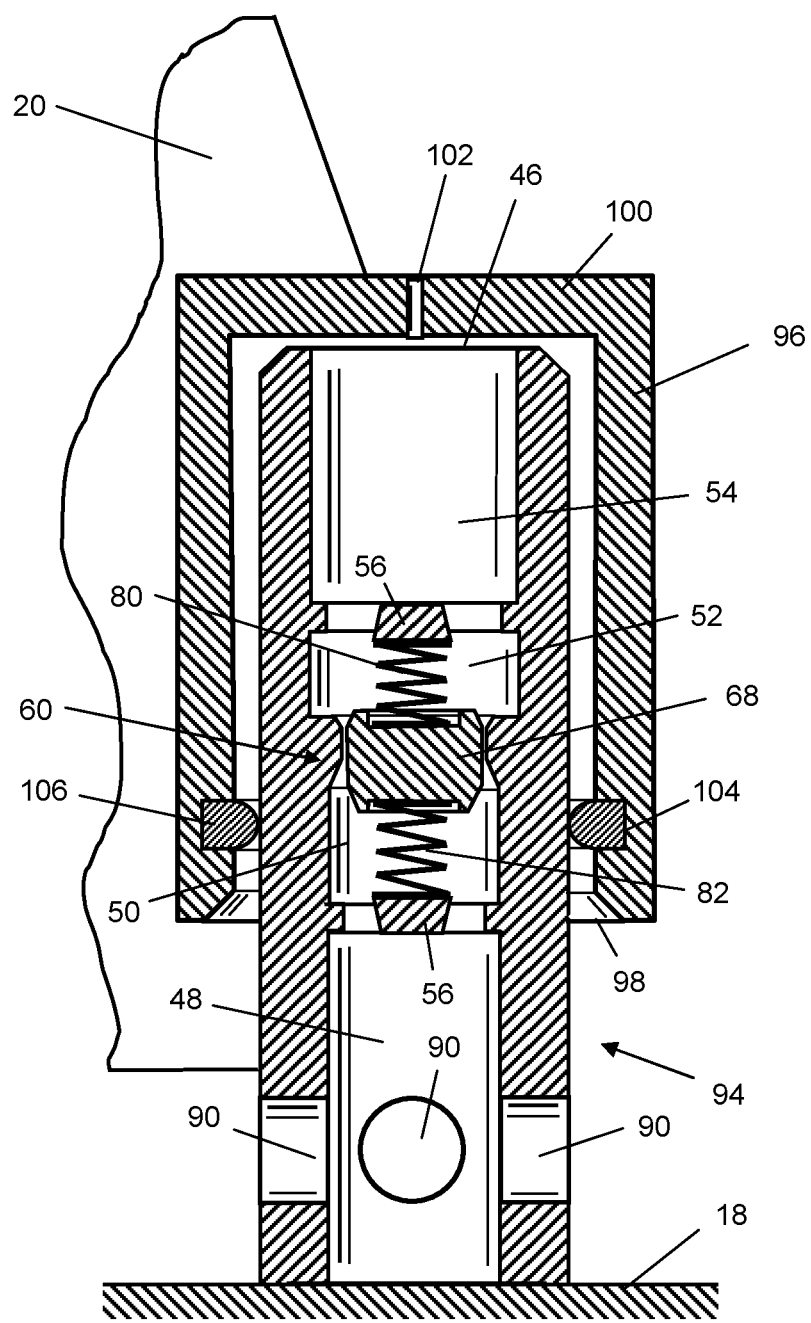

FIG. 5 corresponds to FIG. 4 but shows the load absorber in the process of engagement with the post;

FIG. 6 corresponds to FIG. 5 but shows the load absorber in a steady state following full engagement with the post;

FIG. 7 corresponds to FIG. 6 but shows the load absorber lifted out of full engagement with the post due to a disturbance such as wave action;

FIG. 8 is a sectional side view of a variant of the invention in which a post on a moving body is shown engaged with a load absorber on a fixed body;

FIG. 9 is a sectional side view of another embodiment of the invention in which a load absorber is implemented as a male element received within a female cup; and FIG. 10 is a sectional side view of a variant of the embodiment shown in FIG. 9, in which a female cup on a moving body is shown engaged with a load absorber on a fixed body.

Figure 1:
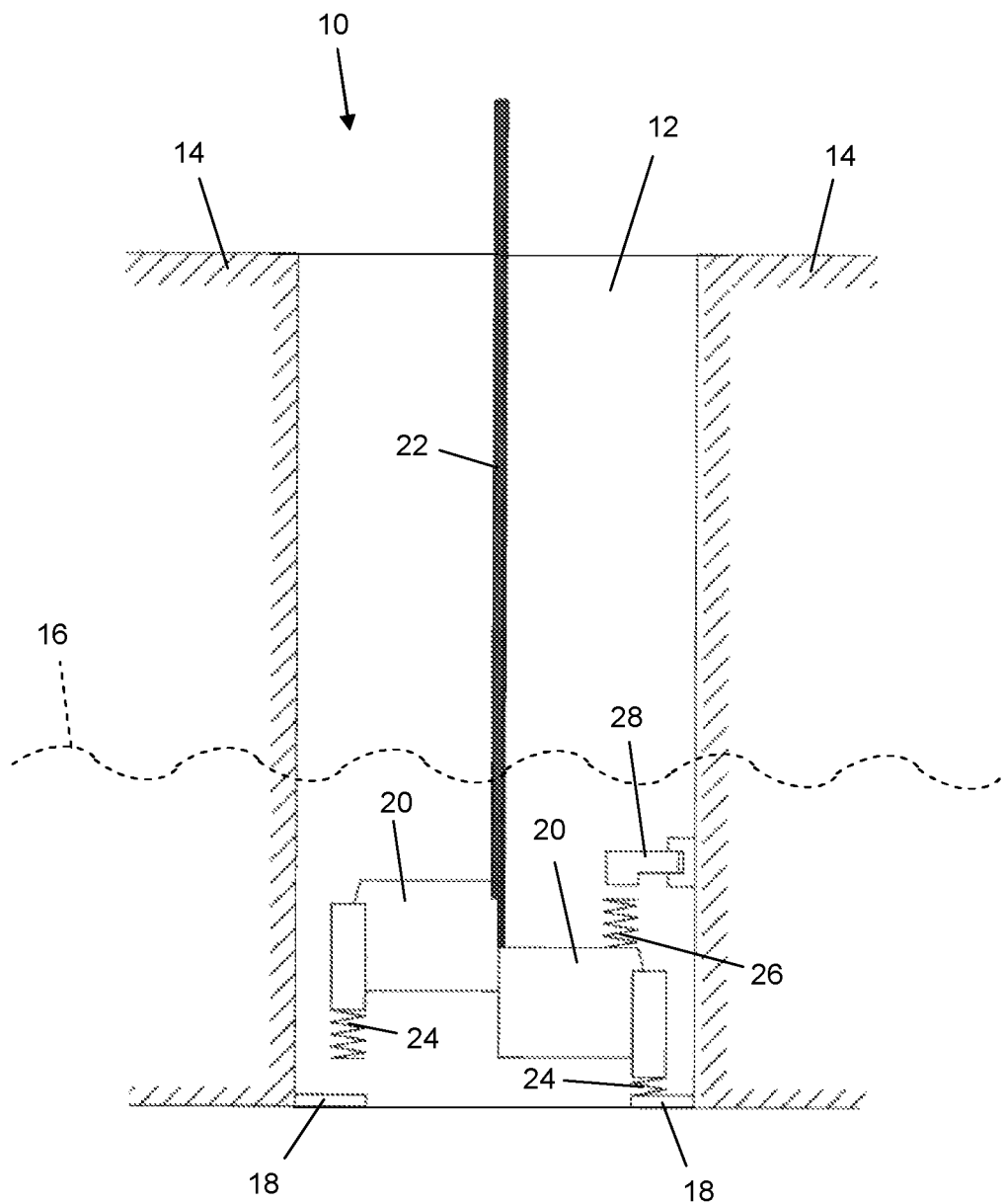
Figure 2:
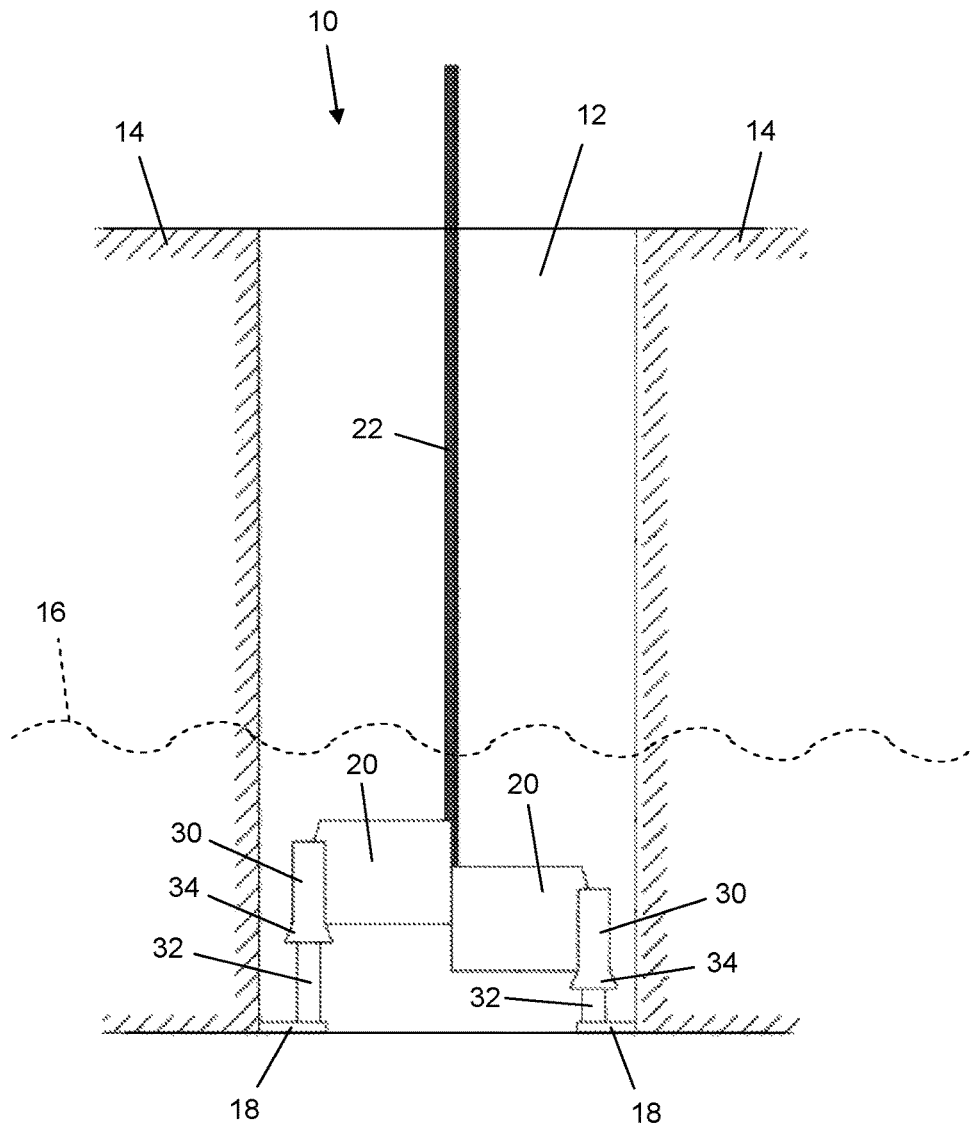
FIG. 2 is a schematic side view showing one application of a load absorber of the invention.

Referring next, then, to FIG. 2 of the drawings, like numerals are used for like parts. Here, like FIG. 1, a LARS of the invention is shown schematically in a moonpool 12 of an ROV support vessel 10. A cursor 20 suspended by a winch wire 22 is movable up and down within the moonpool 12 to positions above and below the water surface 16. At the bottom of its range of movement, the cursor 20 rests on an underwater landing base 18 cantilevered inwardly from a wall of the hull 14 surrounding the moonpool 12. Again, guide structures such as rails for the cursor 20 and a winch acting on the winch wire 22 have been omitted from FIG. 2.

In the embodiment shown in FIG. 2, the compression springs of FIG. 1 have been replaced by at least one paired combination of a load absorber 30 mounted on the cursor 20 and a cylindrical dummy post 32 upstanding from the landing base 18 that is positioned to cooperate with the load absorber 30. Specifically, the load absorber 30 comprises an upright elongate tubular structure that is positioned to align longitudinally axially with the opposed post 32 so as to receive the post 32 telescopically in female-male relation when the cursor 20 nears the bottom of its range of travel in the moonpool 12.

The load absorber 30 has an open bottom end defining a socket to receive the post 32. To ease alignment for insertion of the post 32 into the socket, the socket is surrounded by a downwardly-flared skirt 34 in this example. For the same purpose, the upper end of the post 32 may also be tapered; such tapering cannot be seen in FIG. 2 but is evident in the detail sectional views of FIGS. 4 and 7.

Figure 3:
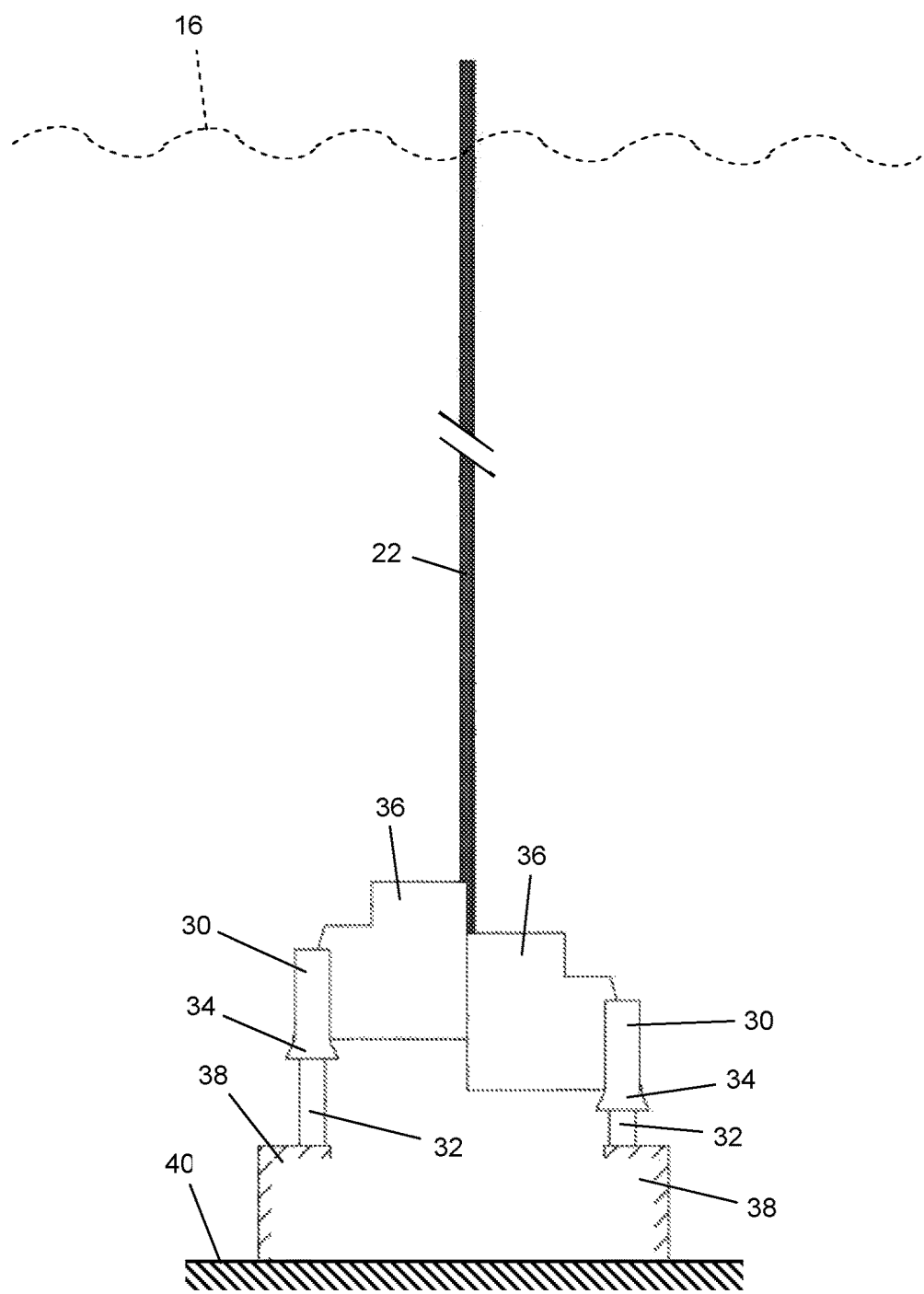
FIG. 3 is a schematic side view showing another application of a load absorber of the invention.

FIG. 3 shows that the principle of the invention may be applied independently of a LARS or a moonpool, separately from a support vessel. Again, like numerals are used for like parts. In this case, one or more load absorbers 30 are mounted to a wireline-deployable payload such as a subsea equipment module 36 to absorb shock loading when the module 36 is landed on a fixed subsea base structure 38. The base structure 38 may, for example, be a foundation on the seabed 40 or an accessory or fitting of a subsea pipeline, deep below the surface 16. Optionally, the load absorbers 30 damp or resist vertical oscillation after the module 36 has been landed on the base structure 38.

In this embodiment of the invention, the posts 32 stand up from the base structure 38 to align longitudinally axially with the opposed load absorbers 30 of the module 36. Hence, the posts 32 enter the sockets at the bottom of the load absorbers 30 when the module 36 closely approaches the base structure 38.

It will be described next with reference to FIGS. 4 to 7 how the load absorbers 30 preferably allow limited damped vertical movement relative to the posts 32 after engagement with the posts 32. Comparison of the left and right sides of the drawings in FIG. 2 and FIG. 3 shows the typical range of vertical movement as the load absorber 30 slides up and down along the post 32 when so engaged.

Referring now, then, to FIGS. 4 to 7, like numerals are again used for like parts. In this sequence of drawings, a load absorber 30 is shown in longitudinal diametrical section attached to a cursor 20 of a LARS system. A post 32 stands upright from a landing base 18 fixed to the hull of a vessel. The post 32 is aligned with the load absorber 30 along a common central longitudinal axis 42.

Of course, the post 32 shown in FIGS. 4 to 7 could alternatively be fixed atop a subsea base structure as shown in FIG. 3, where the cursor 20 is replaced with a wireline-deployable payload such as a subsea equipment module.

The flared skirt around the bottom of the load absorber 30 shown in FIGS. 2 and 3 has been omitted from FIGS. 4 to 7. However, the tapered upper end of the post 32 is apparent in these views, leaving a major portion of the overall length of the post 32 of full diameter and uniform circular cross-section.

It will be evident from FIGS. 4 to 7 that the tubular structure of the load absorber 30 is open at its opposed ends 44, 46 and is hollow to define a through-passage between those open ends 44, 46. The through-passage is rotationally symmetrical about the central longitudinal axis 42. The through-passage floods quickly and fully as soon as the cursor 20 and hence the load absorber 30 are submerged in water. Flooding with water and expulsion of trapped air is aided by the upright orientation of the load absorber 30, which encourages air to vent through the open top end 44 when displaced by inrushing water. In this respect, it is important that the load absorber 30 floods quickly upon submergence when the load absorber 30 is used in a LARS, as the cursor 20 will encounter the landing base 18 soon after submergence.

In this example, the through-passage inside the load absorber 30 comprises four cavities in fluid communication with the, or each, neighbouring cavity. In longitudinal succession from the top or distal end 44 to the bottom or proximal end 46, those cavities are: an open-ended upper distal cavity 48 whose open top end coincides with the top end 44 and defines an inlet/outlet opening of the load absorber 30; a distal flow cavity 50; a proximal flow cavity 52 below the distal flow cavity 50; and an open-ended lower proximal socket cavity 54 whose open bottom end coincides with the bottom end 46.

The proximal flow cavity 52 is wider radially than the distal flow cavity 50. Optionally, as shown, the proximal flow cavity 52 is shorter longitudinally than the distal flow cavity 50. In this example, the proximal flow cavity 52 is as wide radially as the socket cavity 54 although that equivalence of diameter is not essential. Also, the narrower distal flow cavity 50 is as wide radially as the distal cavity 48 although again that equivalence of diameter is not essential.

Longitudinally-spaced perforated plates 56 extend transversely across the through-passage, one between the distal cavity 48 and the distal flow cavity 50 and the other between the proximal flow cavity 52 and the socket cavity 54. Each plate 56 is perforated by wide apertures 58 that permit fluid flow with minimal restriction between the cavities that the plates 56 separate.

The through-passage narrows at a throat formation 60 disposed between the distal flow cavity 50 and the proximal flow cavity 52. The throat formation 60 comprises upper and lower frusto-conical chamfers 62, 64 separated by a parallel-sided central band 66 that defines the narrowest part of the throat formation 60.

A shuttle plug 68 is movable longitudinally through the throat formation 60. The shuttle plug 68 has an irregular octagonal cross-section comprising upper and lower frusto-conical chamfers 70, 72 separated by a radially wider and longitudinally longer parallel-sided central portion 74 that defines the widest part of the shuttle plug 68. The shuttle plug 68 also has upper and lower faces 76, 78 that are generally orthogonal to the central longitudinal axis 42.

The central portion 74 of the shuttle plug 68 is slightly narrower, radially, than the central band 66 of the throat formation 60. Here, there may be a close sliding fit between the shuttle plug 68 and the throat formation 60 but a small clearance is preferred as shown. This clearance ensures free longitudinal movement of the shuttle plug 68 in use and allows air to pass readily upwardly between the shuttle plug 68 and the throat formation 60 during flooding of the load absorber 30. This ensures that the through-passage floods fully and quickly without trapping pockets of air that could otherwise prevent correct operation of the load absorber 30.

Upper and lower springs 80, 82 are aligned with the central longitudinal axis 42 on respective sides of the shuttle plug 68. Thus, the upper spring 80 is disposed within the distal flow cavity 50 and the lower spring 82 is disposed within the proximal flow cavity 52.

The springs 80, 82 act in compression and mutual opposition between the upper and lower faces 76, 78 of the shuttle plug 68 and respective ones of the transverse perforated plates 56.

The open bottom end 46 of the load absorber 30 defines a mouth that is wide enough to encircle and to receive the full-diameter major portion of the post 32 into the socket cavity 54. The radially inner edge of the mouth is chamfered frusto-conically to ease alignment and insertion of the post 32 into the socket cavity 54.

A circumferential internal groove 84 disposed longitudinally inwardly above the bottom end 46 supports a ring seal 86. The ring seal 86 extends radially inwardly into the socket cavity 54 to be a sliding fit with the full-diameter major portion of the post 32.

In a rest state shown in FIGS. 4 and 6, the biases of the opposed springs 80, 82 balance to hold the shuttle plug within the throat formation 60. Here, the central portion 74 of the shuttle plug 68 is held in longitudinal alignment with the central band 66 of the throat formation 60 with respect to a flow direction along the through-passage. This leaves no more than a small clearance that readily allows for expulsion of air along the through-passage during flooding of the load absorber 30 but more strongly resists a rapid flow of water in either direction through the throat formation 60.

When the cursor 20 and the flooded load absorber 30 are lowered through the water toward the post 26 as shown in FIG. 4, water pressure in the socket cavity 54 increases slightly because the open bottom end 46 faces in the direction of travel. A small flow of water may bleed upwardly past the shuttle plug 68 in consequence. However, the compressive force of the upper spring 80 is sufficient to resist this slight increase in pressure while keeping the shuttle plug 68 within the throat formation 60. Thus, the shuttle plug 68 continues to resist any substantial upward flow of water along the through-passage between the various successive cavities 54, 52, 50, 48 of the load absorber 30.

As only a minimal flow of water can escape from the socket cavity 54 through the throat formation 60 past the shuttle plug 68, there is a correspondingly minimal flow of water into the open bottom end 46 of the load absorber 30 as it moves longitudinally through the water. It follows that the load absorber 30 effectively emulates a solid cylinder in its hydrodynamic characteristics. Compared with an open-ended tube known in the prior art that permits a substantial internal through-flow of water, this reduces the risk of the load absorber 30 inducing unwanted oscillation of the cursor 20 during their movement together through the water column. This is of particular importance for wireline-deployed payloads during a long transit from the surface to a deep-water location, where the guidance of a LARS is no longer available.

FIG. 5 shows the post 32 entering the socket cavity 54 in the load absorber 30 as a sliding fit within the surrounding ring seal 86. The post 32 closes the socket cavity 54 to define a variable-volume actuating chamber, whose volume reduces as the post 32 slides further into the socket cavity 54.

The shock load of the incoming post 32 acting as a piston within the socket cavity 54 rapidly increases the pressure of water trapped in the socket cavity 54 and the proximal flow cavity 52 by the post 32. A minor proportion of that trapped water may bleed from the socket cavity 54 into the surrounding body of water through the small clearance between the post 32 and the ring seal 86. However, most of the trapped water will bleed from the socket cavity 54 via the proximal flow cavity 52 and through the throat formation 60 past the shuttle plug 68, noting here that the sharp increase in water pressure within the socket cavity 54 and the proximal flow cavity 52 has overcome the bias of the upper spring 80 to displace the shuttle plug 68 longitudinally upwardly or distally into the distal flow cavity 50. The bias of the upper spring 80 acts on the shuttle plug 68 in a downward or proximal direction that is opposed to upward or distal water flow along the through-passage.

It will be noted in FIG. 5 that the shuttle plug 68 has been displaced upwardly, or downstream with respect to flow of water out of the socket cavity 54, to an extent that brings the closely-fitting central portion 74 of the shuttle plug 68 out of longitudinal alignment with the central band 66 of the throat formation 60. Instead, the central portion 74 of the shuttle plug 68 now opposes the tubular wall of the load absorber 30 around the distal flow cavity 50. Also, the lower chamfer 72 of the shuttle plug 68 is now in longitudinal alignment with the upper chamfer 62 of the throat formation 60. The substantially greater annular clearance between those chamfers 62, 72 and between the central portion 74 of the shuttle plug 68 and the wall of the distal flow cavity 50 allows water to escape more readily from the socket cavity 54 via the proximal flow cavity 52. The escaping water flows around the shuttle plug 68 in the distal flow cavity 50 into the distal cavity 48 and from there out of the open top end 44 of the load absorber 30 into the surrounding sea.

Throughout continued insertion of the post 32 into the socket cavity 54, the upwardly-displaced but downwardly-biased shuttle plug 68 continues to occlude the lumen of the through-passage in the load absorber 30, serving as a flow restriction that restricts the flow of water escaping from the socket cavity 54 via the proximal flow cavity 52. This restricted escape of water from the socket cavity 54 provides cushioning resistance as the cursor 20 settles and the load absorber 30 slides telescopically along the post 32 until the bottom end 46 of the load absorber 30 rests on the landing base 18 as shown in FIG. 6.

In practice, the shuttle plug 68 may be displaced upwardly to a greater extent under the initial shock loading as the post 32 enters the socket cavity 54. This absorbs kinetic energy and starts to slow the descent of the load absorber 30 and hence of the cursor 20. As the velocity of the load absorber 30 relative to the post 32 reduces and hence drives water up the through-passage more slowly, the bias of the upper spring 80 reasserts itself against the reduced water flow to move the shuttle plug 68 downwardly or proximally, closer to realignment with the throat formation 60.

When the bottom end 46 of the load absorber 30 encounters the landing base 18 as shown in FIG. 6, the post 32 cannot be inserted further into the socket cavity 54 and therefore its piston effect ceases. Consequently, there is no further flow of water up the through-passage from the socket cavity 54 into the proximal flow cavity 52 and through the throat formation 60. This allows the bias of the upper spring 80 to move the shuttle plug 68 downwardly back into alignment with the throat formation 60. The shuttle plug 68 is now back in its rest position as also shown in FIG. 4.

With the shuttle plug 68 back in its rest position and the post 32 fully inserted into the socket cavity 54 as shown in FIG. 6, the load absorber 30 is ready to resist subsequent rapid distal or upward movement of the cursor 20 relative to the landing base 18. In this respect, reference is made to FIG. 7, which shows the cursor 20 jolted upwardly slightly away from the landing base 18 as if by wave action or vessel heave. This movement of the cursor 20 has pulled the load absorber 30 upwardly relative to the post 32, in effect partially withdrawing the post 32 from the socket cavity 54.

In this respect, the post 32 serves as a double-acting piston that, on withdrawal, reduces the pressure of water in the socket cavity 54. The reduced pressure in the socket cavity 54 draws water down the through-passage in the load absorber 30, which water enters the load absorber 30 through the open top end 44 and then flows through the upper distal cavity 48, the distal flow cavity 50 and the proximal flow cavity 52 to enter the socket cavity 54.

On flowing from the distal flow cavity 50 into the proximal flow cavity 52, the water flowing down the through-passage flows through the throat formation 60 past the shuttle plug 68. In this case, resistance of the shuttle plug 68 and the throat formation 60 to the downward flow of water increases pressure in the water on the upper or distal side of the shuttle plug 68. This increased water pressure on the upper side of the shuttle plug 68 combines with the reduced water pressure on the lower or proximal side of the shuttle plug 68 to overcome the upward bias of the lower spring 82, displacing the shuttle plug 68 longitudinally downwardly or proximally into the proximal flow cavity 52. The bias of the lower spring 82 acts on the shuttle plug 68 in an upward or distal direction that is opposed to downward or proximal water flow along the through-passage.

It will be noted in FIG. 7 that the shuttle plug 68 has been displaced downwardly, or downstream with respect to flow of water into the socket cavity 54, to an extent that brings the closely-fitting central portion 74 of the shuttle plug 68 out of longitudinal alignment with the central band 66 of the throat formation 60. Instead, the central portion 74 of the shuttle plug 68 now opposes the tubular wall of the load absorber 30 around the proximal flow cavity 52. Also, the upper chamfer 70 of the shuttle plug 68 is now in longitudinal alignment with the lower chamfer 64 of the throat formation 60. The substantially greater annular clearance between those chamfers 64, 70 and between the central portion 74 of the shuttle plug 68 and the wall of the proximal flow cavity 52 allows water to enter the socket cavity 54 more readily via the proximal flow cavity 52.

Throughout continued withdrawal of the post 32 from the socket cavity 54, the downwardly-displaced but upwardly-biased shuttle plug 68 continues to occlude the lumen of the through-passage in the load absorber 30, serving as a flow restriction that restricts the flow of water entering the socket cavity 54 via the proximal flow cavity 52. This restricted entry of water into the socket cavity 54 creates resistance to upward movement of the cursor 20 as the load absorber 30 slides telescopically up the post 32. On initial sudden upward movement of the load absorber 30, the shuttle plug 68 can displace to a greater longitudinal extent. Then, as the upward movement of the load absorber 30 is controlled and slows as the restricted water flow absorbs the kinetic energy of the disturbed cursor 20, the velocity of the load absorber 30 relative to the post 32 reduces and hence draws water down the through-passage more slowly. In consequence, the bias of the lower spring 82 reasserts itself against the reduced water flow to move the shuttle plug 68 upwardly or distally, closer to realignment with the throat formation 60. This progressively increases resistance to water flow, which eventually substantially ceases and allows the shuttle plug 68 to resume the rest position within the throat formation 60 as shown in FIGS. 4 and 6. The load absorber 30 is then ready to resist further disturbance of the cursor 20 or to allow the cursor 20 to settle slowly back onto the landing base 18 with controlled damped movement.

It has been noted above that the proximal flow cavity 52 is wider radially than the distal flow cavity 50 in the preferred embodiment shown in FIGS. 4 to 7. This allows water to flow more readily around the shuttle plug 68 when the shuttle plug 68 is displaced proximally than when the shuttle plug 68 is displaced distally. It follows that the damping response of the load absorber 30 is directionally asymmetric: in this example, downward or proximal movement of the load absorber 30 relative to the post 32 is resisted more strongly than upward or distal movement of the load absorber 30 relative to the post 32. Thus, the load absorber 30 effectively cushions shock loads as the cursor 20 encounters the landing base 18 but presents less resistance to the cursor 20 being lifted gradually clear of the landing base 18, hence leaving normal operation of the LARS undisturbed.

The difference in diameter between the distal flow cavity 50 and the proximal flow cavity 52 is just one example of how to create a damping response that is asymmetric in the distal and proximal directions. One general approach involves asymmetry of shape or dimension of the formations that define a water flow path between the proximal and distal sides of the throat formation 60. In the embodiment shown, those formations comprise the walls of the proximal flow cavity 52 and the distal flow cavity 50 and the features such as chamfers that give shape to the throat formation 60 and the shuttle plug 68. Any or all of those formations may be shaped or dimensioned to modify flow characteristics along the through-passage of the load absorber 30, for example by varying clearances between opposed features such as chamfers that define flow restrictions.

In another general approach to create a directionally-asymmetric damping response, it would also be possible to select different spring characteristics for the springs 80, 82. For example, an upper or distal spring 80 may be selected that exerts greater force or resistance to movement on the shuttle plug than the lower or proximal spring 82. It is also possible for one or more of the springs 80, 82 to be of a variable-rate type in which resistance varies with displacement.

FIGS. 8, 9 and 10 show variants of the invention. Like numerals are used for like parts. In each case, the load absorber on one subsea body is shown fully engaged with a male post or a female cup on another subsea body; consequently, the shuttle plug 68 is shown in its rest position.

The variant shown in FIG. 8 is an inversion or reversal of the arrangement shown in FIGS. 4 to 7. Thus, FIG. 8 shows that it is possible for the post 32 to be located on a movable structure such as a cursor 20 and for a load absorber 88 to be located on a fixed structure such as a landing base 18. Here, therefore, the post 32 hangs downwardly from the cursor 20 and enters the top end of the load absorber 88, which now serves as the proximal end 46 of the load absorber 88.

Other features of the load absorber 88 shown in FIG. 8 are also inverted relative to their counterparts in the load absorber 30 of FIGS. 4 to 7. Thus, in longitudinal succession from the top or proximal end 46 to the bottom or distal end 44, the through-passage in the load absorber 88 comprises: an open-topped upper proximal socket cavity 54 whose open top coincides with the proximal end 46; a proximal flow cavity 52; a distal flow cavity 50 below the proximal flow cavity 52; and a lower distal cavity 48 whose bottom end coincides with the distal end 44. Again, longitudinally-spaced perforated plates 56 extend transversely across the through-passage, to separate the distal cavity 48 from the distal flow cavity 50 and the proximal flow cavity 52 from the socket cavity 54.

The open proximal end 46 at the top of the load absorber 88 defines a mouth that is wide enough to receive the downwardly-moving post 32 into the socket cavity 54, where the post 32 forms a sliding fit with a surrounding ring seal 86.

Again, the through-passage narrows at a throat formation 60 disposed between the distal flow cavity 50 and the proximal flow cavity 52. A shuttle plug 68 is movable longitudinally through the throat formation 60. The shuttle plug 68 is suspended between, and biased by, upper and lower springs 80, 82 that act in compression and mutual opposition. However in this case, the upper spring 80 is disposed within the proximal flow cavity 52 and the lower spring 82 is disposed within the distal flow cavity 50.

For the same reasons as in the load absorber 30 of FIGS. 4 to 7, the shapes of the throat formation 60 and the shuttle plug 68 mirror those of the load absorber 30 shown in FIGS. 4 to 7, but inverted; similarly, the proximal flow cavity 52 is wider radially than the distal flow cavity 50.

The load absorber 88 also differs from the load absorber 30 of FIGS. 4 to 7 in that the distal end 44, now at the bottom, is closed by the landing base 18. Thus, the tubular wall of the load absorber 88 surrounding the distal cavity 48 is penetrated by one or more apertures 90. Water flows from the flooded distal cavity 48 through the apertures 90 as the post 32 enters the proximal socket cavity 54. Conversely, water is drawn into the distal cavity 48 through the apertures 90 as the post 32 is withdrawn from the proximal socket cavity 54.

FIGS. 9 and 10 show other load absorber variants referenced as 92 and 94 respectively. These variants show that a load absorber of the invention need not be a female element but could instead be a male element of a telescopic arrangement.

In each of FIGS. 9 and 10, the post 32 of the preceding embodiments is replaced by a cup 96 having an open end or mouth 98 and a closed end 100. The cup 96 and the load absorbers 92, 94 each have circular cross-sections. An internal chamfer on the rim at the open end 98 of the cup 96 cooperates with an external chamfer at the proximal end 46 of the load absorber 92, 94 to guide the load absorber 92, 94 into the cup 96.

The cups 96 shown in FIGS. 9 and 10 may be mounted on a fixed structure such as a landing base 18, as shown in FIG. 9, or on a movable structure such as a cursor 20 as shown in FIG. 10. In the former case, the cup 96 faces upwardly to present an open top end 98 that receives a downwardly-extending load absorber 92 hanging down from the cursor 20. In the latter case, the cup 96 faces downwardly to present an open bottom end 98 that receives an upwardly-extending load absorber 94 standing up from the landing base 18. The closed end 100 of the inverted cup shown in FIG. 10 suitably has one or more small air holes 102 to allow air to escape from the interior of the inverted cup 96 to enable full flooding of the cup 96 upon submergence.

The cups 96 shown in FIGS. 9 and 10 each contain a circumferential internal groove 104 that supports a ring seal 106 disposed longitudinally inwardly of the open end 98. The ring seal 106 extends radially inwardly into the cup 96 to be a sliding fit with the convex external wall of the load absorber 92, 94.

Specifically, the open end 98 of a cup 96 receives a proximal end 46 of a load absorber 92, 94 in telescopic relation to define a variable-volume actuating chamber between the cup 96 and the load absorber 92, 94. The volume of the actuating chamber reduces as the proximal end 46 of the load absorber 92, 94 slides further into the flooded cup 96 in use. That reduction of volume drives water distally along the through-passage of the load absorber 92, 94 and through the flow restrictor that comprises the throat formation 60 and the shuttle plug 68. Conversely, withdrawal of the load absorber 92, 94 from the cup 96 expands the actuating chamber to draw water through the flow restrictor in the opposite, proximal direction. The shuttle plug 68 moves within the throat formation 60 accordingly, in the manner illustrated in FIGS. 4 to 7, to resist the flow of water along the through-passage and hence to control relative movement between the cup 96 and the load absorber 92, 94.

The internal features along the through-passage of the load absorber 92 shown in FIG. 9 correspond to those of the load absorber 30 shown in FIGS. 4 to 7, apart from omission of the internal chamfer of the proximal end 46 and the internal ring seal 86. Similarly, the internal features along the through-passage of the inverted load absorber 94 shown in FIG. 9 correspond to those of the inverted load absorber 88 shown in FIG. 8, again apart from omission of the internal chamfer of the proximal end 46 and the internal ring seal 86. The operation of the load absorbers 92, 94 of FIGS. 9 and 10 corresponds to the operation of the load absorbers 30, 88 of FIGS. 4 to 7 and 8 respectively, and so will not be described again here.

Many other variations are possible within the inventive concept. For example, the distal cavity shown in FIGS. 4 to 8 of the drawings could be omitted such that the inlet/outlet opening is defined by one or more inlet/outlet apertures communicating directly with the outlet flow chamber. Similarly, the proximal cavity shown in FIGS. 9 and 10 of the drawings could be omitted, in which case the proximal flow cavity will be adjacent to the proximal end of the load absorber.

Opposed springs or multiple springs are not essential; nor is it essential that springs act in compression. For example, it would be possible instead for one or more springs to act in compression when the shuttle plug is displaced in one direction and in tension when the shuttle plug is displaced in the opposite direction. Indeed, bias devices other than springs could be used.

The longitudinal axis of the load absorber and hence of the cooperating post or cup need not necessarily be vertical or upright. In principle, the load absorber and the post or cup could be in any other orientation, such as horizontal, if that is the direction in which one subsea body moves relative to another. Directional or positional references in the foregoing description such as upper, lower, top and bottom should therefore be regarded as specific to the upright orientation of the load absorber shown in FIGS. 2 to 10 of the drawings.

Whilst it is preferred for compactness and simplicity that the flow restrictor comprising the shuttle plug and the throat formation is stacked longitudinally along the same longitudinal axis as in the through-passage, this is not essential provided that there is fluid communication between the flow restrictor and the or each other cavity in the load absorber.

The invention claimed is:

1. A subsea load absorber for dampening relative movement between subsea bodies, which load absorber is cooperable in use when on one of the subsea bodies with an actuating member on another of the subsea bodies, and comprises:

a hollow structure that defines an internal flow path for water, communicating with a proximal opening; and a flow restrictor acting on the flow path that is positioned to restrict a distal flow of water along the flow path from the proximal opening in use, which distal flow is caused by relative convergent movement between the actuating member and the load absorber;

wherein the flow restrictor comprises a shuttle element that is arranged to restrict the flow path and is movably mounted to the structure for automatic movement relative to the structure from a first state to a second state in response to an increase in water pressure at the proximal opening, the shuttle element in the first state effecting greater restriction of the distal flow along the flow path and in the second state effecting lesser restriction of the distal flow along the flow path, the shuttle element being mounted for progressive movement from the first state to the second state as the water pressure at the proximal opening progressively increases, so as to effect progressively less resistance to the distal flow, thereby dampening the relative movement to a progressively lesser degree.

2. The load absorber of claim 1, further including a seal positioned to act between the load absorber and the actuating member of the other subsea body.

3. The load absorber of claim 1, wherein the proximal opening communicates with a socket cavity having an open end adapted to receive a male piston element that serves as the actuating member.

4. The load absorber of claim 1, further comprising a distal opening in fluid communication with the proximal opening to exhaust the distal flow of water, wherein the flow restrictor is disposed between the proximal opening and the distal opening to restrict the distal flow of water along the flow path in use.

5. The load absorber of claim 1, wherein the shuttle element is biased to remain in the first state while increasing water pressure at the proximal opening remains below a threshold value and to move into the second state when water pressure at the proximal opening increases to greater than the threshold value.

6. The load absorber of claim 1, wherein in the first state, the shuttle element is aligned with a narrowed throat formation of the flow restrictor with respect to a flow direction along the flow path.

7. The load absorber of claim 6, wherein in the second state, a proximal edge of the shuttle element aligns with or lies distally relative to a distal edge of the throat formation.

8. The load absorber of claim 1, wherein in the second state, the shuttle element is aligned with a distal cavity of the flow restrictor that provides greater clearance around the shuttle element than when the shuttle element is in the first state.

9. The load absorber of claim 1 and being arranged such that relative divergent movement between the actuating member and the load absorber, in use, draws a proximal flow of water through the flow restrictor toward the proximal opening, wherein the shuttle element of the flow restrictor is movable automatically relative to the structure from the first state into a third state in response to a reduction in water pressure at the proximal opening during said relative divergent movement, the shuttle element in the third state effecting less restriction of the flow path than in the first state.

10. The load absorber of claim 9, wherein the shuttle element effects less restriction of the flow path when in the third state than in the second state.

11. The load absorber of claim 9, wherein the shuttle element is biased to remain in the first state while decreasing water pressure at the proximal opening remains above a threshold value and to move into the third state when water pressure at the proximal opening decreases to less than the threshold value.

12. The load absorber of claim 9, wherein in the third state, a distal edge of the shuttle element aligns with or lies proximally relative to a proximal edge of the narrowed throat formation of the flow restrictor.

13. The load absorber of claim 12, wherein the proximal edge of the throat formation has a different profile to a distal edge of the throat formation.

14. The load absorber of claim 9, wherein in the third state, the shuttle element is aligned with a proximal cavity of the flow restrictor that provides greater clearance around the shuttle element than when the shuttle element is in the first state.

15. The load absorber of claim 14, wherein the proximal cavity of the flow restrictor provides greater clearance around the shuttle element than when the shuttle element is in the second state.

16. The load absorber of claim 1, further comprising at least one bias member acting between the structure and the shuttle element to bias the shuttle element into the first state and to permit movement of the shuttle element out of the first state against that bias.

17. The load absorber of claim 16, wherein the shuttle element is supported by the or each bias member for movement relative to the structure.

18. The load absorber of claim 16, wherein the or each bias member is a spring acting in compression or tension between the shuttle element and the structure.

19. The load absorber of claim 16, wherein first and second bias members act on the shuttle element in mutual opposition.

20. The load absorber of claim 19, wherein the first and second bias members apply different levels of restoring force to the shuttle element.

21. The load absorber of claim 1, wherein the shuttle element substantially occludes the flow path when in the first state.

22. The load absorber of claim 1, wherein an airflow clearance remains around the shuttle element when in the first state.

23. The load absorber of claim 1, wherein the proximal opening and the flow restrictor are substantially aligned in longitudinal succession.

24. The load absorber of claim 23, wherein the proximal opening and the flow restrictor are substantially aligned with a direction of relative convergent movement between the actuating member of the other subsea body and the load absorber.

25. A method of dampening relative movement between subsea bodies, the method comprising:
  effecting relative convergent movement between an actuating member on one of the subsea bodies and a load absorber on another of the subsea bodies to expel water distally along a flow path from a proximal opening through a flow restrictor, and
  automatically moving a shuttle element of the flow restrictor in a progressive movement from a first state to a second state in response to a progressive increase in water pressure at the proximal opening, the shuttle element in the first state effecting greater restriction of distal flow along the flow path and in the second state effecting lesser restriction of distal flow along the flow path, such that progressive movement of the shuttle effects progressively less resistance to the distal flow, thereby dampening the relative movement to a progressively lesser degree.

26. The method of claim 25, wherein the actuating member is inserted into the load absorber during said relative convergent movement.

27. The method of claim 25, wherein the load absorber is inserted into the actuating member during said relative convergent movement.

28. The method of claim 25, comprising sealing between the actuating member and the load absorber.

29. The method of claim 25, comprising biasing the shuttle element into the first state against increasing water pressure at the proximal opening.

30. The method of claim 29, comprising holding the shuttle element in the first state until water pressure at the proximal opening exceeds a threshold value before allowing the shuttle element to move into the second state.

31. The method of claim 25, wherein the shuttle element moves away from the proximal opening when transitioning between the first state and the second state.

32. The method of claim 25, wherein the shuttle element returns to the first state when relative convergent movement between the actuating member and the load absorber ceases.

33. The method of claim 25, comprising:
subsequently effecting relative divergent movement between the actuating member and the load absorber to draw a proximal flow of water through the flow restrictor toward the proximal opening; and
automatically moving the shuttle element of the flow restrictor from the first state into a third state in response to a reduction in water pressure at the proximal opening, the shuttle element in the third state effecting less restriction of the flow path than in the first state.

34. The method of claim 33, comprising holding the shuttle element in the first state until water pressure at the proximal opening decreases below a threshold value before allowing the shuttle element to move into the third state.

35. The method of claim 33, wherein the shuttle element moves toward the proximal opening when transitioning between the first state and the third state.

36. The method of claim 33, wherein the shuttle element returns to the first state when relative divergent movement between the actuating member and the load absorber ceases.

37. The method of claim 25, preceded by submerging the load absorber to cause water to flood the flow path.

38. The method of claim 37, comprising allowing air to exhaust from the flooding flow path through the flow restrictor.

39. The method of claim 38, comprising allowing air to pass through the flow restrictor when the shuttle element is in the first state.

40. A subsea load absorber system arranged to act between relatively-movable subsea bodies, the system comprising a load absorber on one of the subsea bodies and an actuating member on another of the subsea bodies, wherein:
the actuating member is cooperable with the load absorber to define an actuating chamber of variable volume that is flooded with water when the system is submerged in use;
the load absorber comprises a hollow structure that defines an internal flow path for water, communicating with the actuating chamber;
a flow restrictor acting on the flow path is positioned to restrict an outward flow of water along the flow path from the actuating chamber in use, which outward flow is caused by relative convergent movement between the actuating member and the load absorber that reduces the volume of the actuating chamber; and
the flow restrictor comprises a shuttle element that is arranged to restrict the flow path and is movably mounted to the structure for automatic movement relative to the structure from a first state to a second state in response to an increase in water pressure in the actuating chamber, the shuttle element in the first state effecting greater restriction of outward flow along the flow path and in the second state effecting lesser restriction of outward flow along the flow path, the shuttle element being mounted for progressive movement from the first state to the second state as the water pressure in the actuating chamber progressively increases, so as to effect progressively less resistance to the outward flow, thereby dampening the relative movement to a progressively lesser degree.

41. The system of claim 40, wherein the actuating member is separate from the load absorber.

42. The system of claim 40, wherein the actuating member is a male piston element and the actuating chamber comprises a socket cavity having an open end positioned to receive the male piston element.

43. The system of claim 40, wherein the actuating member is a female cup element arranged to receive a protruding part of the load absorber.

44. The system of claim 40, further comprising a seal positioned to act between the load absorber and the actuating member.

45. A submersible or subsea body comprising:
the submersible or subsea body being fitted with at least one load absorber or with a subsea load absorber system wherein:
the at least one load absorber for dampening relative movement between subsea bodies, which load absorber is cooperable in use when on one of the subsea bodies with an actuating member on another of the subsea bodies, and the at least one load absorber for dampening comprises:
a hollow structure that defines an internal flow path for water, communicating with a proximal opening; and
a flow restrictor acting on the flow path that is positioned to restrict a distal flow of water along the flow path from the proximal opening in use, which distal flow is caused by relative convergent movement between the actuating member and the load absorber;
wherein the flow restrictor comprises a shuttle element that is arranged to restrict the flow path and is movably mounted to the structure for automatic movement relative to the structure from a first state to a second state in response to an increase in water pressure at the proximal opening, the shuttle element in the first state effecting greater restriction of the distal flow along the flow path and in the second state effecting lesser restriction of the distal flow along the flow path, the shuttle element being mounted for progressive movement from the first state to the second state as the water pressure at the proximal opening progressively increases, so as to effect progressively less resistance to the distal flow, thereby dampening the relative movement to a progressively lesser degree;
or
the subsea load absorber system is arranged to act between relatively-movable subsea bodies, the subsea load absorber system comprises:

a load absorber on one of the subsea bodies and an actuating member on another of the subsea bodies, wherein:

the actuating member is cooperable with the load absorber to define an actuating chamber of variable volume that is flooded with water when the system is submerged in use;

the load absorber comprises a hollow structure that defines an internal flow path for water, communicating with the actuating chamber;

a flow restrictor acting on the flow path is positioned to restrict an outward flow of water along the flow path from the actuating chamber in use, which outward flow is caused by relative convergent movement between the actuating member and the load absorber that reduces the volume of the actuating chamber; and the flow restrictor comprises a shuttle element that is arranged to restrict the flow path and is movably mounted to the structure for automatic movement relative to the structure from a first state to a second state in response to an increase in water pressure in the actuating chamber, the shuttle element in the first state effecting greater restriction of outward flow along the flow path and in the second state effecting lesser restriction of outward flow along the flow path, the shuttle element being mounted for progressive movement from the first state to the second state as the water pressure in the actuating chamber progressively increases, so as to effect progressively less resistance to the outward flow, thereby dampening the relative movement to a progressively lesser degree.

46. The submersible or subsea body of claim 45, being a cursor or a landing platform of a launch and recovery system.

47. A vessel comprising:

a launch and recovery system having a cursor or a landing platform, the cursor or the landing platform being fitted with at least one load absorber or with a subsea load absorber system wherein the at least one load absorber for dampening relative movement between subsea bodies, which load absorber is cooperable in use when on one of the subsea bodies with an actuating member on another of the subsea bodies, and the at least one load absorber for dampening comprises:

a hollow structure that defines an internal flow path for water, communicating with a proximal opening; and a flow restrictor acting on the flow path that is positioned to restrict a distal flow of water along the flow path from the proximal opening in use, which distal flow is caused by relative convergent movement between the actuating member and the load absorber;

wherein the flow restrictor comprises a shuttle element that is arranged to restrict the flow path and is movably mounted to the structure for automatic movement relative to the structure from a first state to a second state in response to an increase in water pressure at the proximal opening, the shuttle element in the first state effecting greater restriction of the distal flow along the flow path and in the second state effecting lesser restriction of the distal flow along the flow path, the shuttle element being mounted for progressive movement from the first state to the second state as the water pressure at the proximal opening progressively increases, so as to effect progressively less resistance to the distal flow, thereby dampening the relative movement to a progressively lesser degree;

or the subsea load absorber system is arranged to act between relatively-movable subsea bodies, the subsea load absorber system comprises:

a load absorber on one of the subsea bodies and an actuating member on another of the subsea bodies, wherein:

the actuating member is cooperable with the load absorber to define an actuating chamber of variable volume that is flooded with water when the system is submerged in use;

the load absorber comprises a hollow structure that defines an internal flow path for water, communicating with the actuating chamber;

a flow restrictor acting on the flow path is positioned to restrict an outward flow of water along the flow path from the actuating chamber in use, which outward flow is caused by relative convergent movement between the actuating member and the load absorber that reduces the volume of the actuating chamber; and the flow restrictor comprises a shuttle element that is arranged to restrict the flow path and is movably mounted to the structure for automatic movement relative to the structure from a first state to a second state in response to an increase in water pressure in the actuating chamber, the shuttle element in the first state effecting greater restriction of outward flow along the flow path and in the second state effecting lesser restriction of outward flow along the flow path, the shuttle element being mounted for progressive movement from the first state to the second state as the water pressure in the actuating chamber progressively increases, so as to effect progressively less resistance to the outward flow, thereby dampening the relative movement to a progressively lesser degree.

* * * * *